United States Patent
Dailliez et al.

(10) Patent No.: US 8,938,330 B2
(45) Date of Patent: Jan. 20, 2015

(54) METHOD FOR CHARACTERISING AND IMPROVING THE BEHAVIOUR OF A VEHICLE

(75) Inventors: Thibault Dailliez, Chamalières (FR); Christophe Egerszegi, Mazaye (FR)

(73) Assignees: Compagnie Generale des Etablissements Michelin, Clermont-Ferrand (FR); Michelin Recherche et Techniques S.A., Granges-Paccot (CH)

( * ) Notice: Subject to any disclaimer, the term of this patent is extended or adjusted under 35 U.S.C. 154(b) by 203 days.

(21) Appl. No.: 13/636,901

(22) PCT Filed: Mar. 31, 2011

(86) PCT No.: PCT/FR2011/050728
§ 371 (c)(1),
(2), (4) Date: Nov. 21, 2012

(87) PCT Pub. No.: WO2011/121247
PCT Pub. Date: Oct. 6, 2011

(65) Prior Publication Data
US 2013/0066516 A1      Mar. 14, 2013

(30) Foreign Application Priority Data
Apr. 2, 2010 (FR) ...................... 10 52539

(51) Int. Cl.
*G01M 17/04* (2006.01)
(52) U.S. Cl.
CPC ..................... *G01M 17/04* (2013.01)
USPC ............................ 701/32.8; 701/38; 701/33.9

(58) Field of Classification Search
USPC ........ 701/32.8, 37–40, 33.4, 33.7, 33.9, 34.4; 73/11.07, 11.08, 11.09
See application file for complete search history.

(56) References Cited

U.S. PATENT DOCUMENTS

| | | | | |
|---|---|---|---|---|
| 5,056,024 | A * | 10/1991 | Stuyts | 701/32.9 |
| 7,778,748 | B2 * | 8/2010 | Probst et al. | 701/31.4 |
| 7,813,850 | B2 * | 10/2010 | Mannerfelt | 701/33.9 |
| 8,165,749 | B2 * | 4/2012 | Izawa et al. | 701/37 |
| 2007/0260373 | A1 | 11/2007 | Langer et al. | 701/29 |
| 2008/0275681 | A1 | 11/2008 | Langer | 703/8 |

FOREIGN PATENT DOCUMENTS

| | | |
|---|---|---|
| DE | 30 23 295 A1 | 1/1982 |
| EP | 0 220 985 A1 | 5/1987 |

* cited by examiner

*Primary Examiner* — Richard Camby
(74) *Attorney, Agent, or Firm* — Fitzpatrick, Cella, Harper & Scinto (57) ABSTRACT

A method is provided for characterizing a straight-line behavior of a given vehicle that includes at least one suspension device. For a given value of a parameter that when varied modifies a friction generated in each suspension device, the method includes steps of:
applying a stress cycle to each suspension device so as to identify a friction present in each suspension device;
determining, for each suspension device, a value of an indicator relating to the friction;
repeating the applying step and the determining step by varying the parameter so as to obtain a variation of the indicator as a function of the parameter; and
for each suspension device, determining an interval of a value of the parameter in which the indicator is greater than a predetermined threshold for the given vehicle.

17 Claims, 10 Drawing Sheets

METHOD FOR CHARACTERISING AND IMPROVING THE BEHAVIOUR OF A VEHICLE

FIELD OF THE INVENTION

The present invention relates generally to the field of improving the road behaviour of vehicles, and more particularly to methods for characterising and improving the road behaviour of a vehicle.

BACKGROUND

In designing a vehicle, the constructor carries out a number of tests aiming to improve the behaviour of the vehicle. These tests comprise so-called objective tests that make it possible to quantitatively qualify the behaviour of the vehicle and so-called subjective tests that can be used to qualitatively qualify the behaviour of the vehicle. The subjective tests are performed by testers who drive the vehicle and qualify its behaviour on the basis of their impression.

The objective tests notably comprise braking, road holding and safety tests. The subjective tests notably comprise headings relating to the straight-line behaviour, the general behaviour and active safety. The straight-line behaviour includes manoeuvres performed for low lateral accelerations of the vehicle, for example so-called direction, linearity, driving approval, centring, and other such manoeuvres.

The purpose of the heading relating to the straight-line behaviour is notably to qualify the response of the vehicle as a function of a stress, generally of low angle amplitude on the steering wheel exerted by the tester, in other words, for example, how the torque on the steering wheel or the yaw of the vehicle vary qualitatively and quantitatively in response to the angle variation on the steering wheel. Thus, for example, a vehicle exhibiting a linear response exhibits a behaviour that is generally judged to be satisfactory by the tester whereas a vehicle for which the response is non-existent for a small angle of rotation of the steering wheel exhibits a behaviour that is generally judged to be unacceptable to the tester.

When the tester judges the straight-line behaviour of the vehicle to be unacceptable, the vehicle is modified then retested by the tester in order for the latter to check whether the vehicle exhibits a satisfactory behaviour following the modifications made. Since the cause of the unacceptable behaviour is not known to the tester, the requests for modifications to be made derive from the experience of said tester. They relate non-exhaustively to the tyres, the wheels, the steering system, the geometry and the elements of the suspension device. The steps listed above are repeated until the vehicle exhibits a straight-line behaviour that is satisfactory to the tester.

BRIEF DESCRIPTION OF THE INVENTION

The design of the vehicle is therefore relatively lengthy and therefore costly.

Hereinafter, depending on the context, the term "wheel" should be taken either in a particular sense, the wheel then consisting of a disc and a wheel rim, or in a general sense which then corresponds to the mounted assembly consisting of a wheel (disc and wheel rim) and a tyre.

The aim of the invention is to provide a method that makes it possible to quickly improve the straight-line behaviour of a vehicle.

To this end, the subject of the invention is a method for characterizing the behaviour of a given vehicle comprising a body, at least one wheel and at least one suspension device linking the wheel to the body, characterized in that for a given value of a parameter, the variation of which modifies friction generated in the suspension device:

(A) at least one predetermined stress cycle is applied to each suspension device so as to identify friction present in the suspension device, and (B) for each suspension device, the value of an indicator relating to the friction characterized in the stress cycle is determined, the steps A and B are repeated by varying the variable parameter so as to obtain a variation of the indicator relating to the friction generated in each suspension device according to at least the variable parameter, and for each suspension device, at least one interval of at least one value of the variable parameter is determined in which the indicator relating to the friction is greater than a predetermined threshold for the given vehicle.

The inventors behind the invention have found, surprisingly, that it is possible to shift the phase of the roll from the yaw: thus, for a given stress on the steering wheel, the more delayed the roll movement, the faster the yaw response of the vehicle and the better the assessment of the behaviour. Thus, the inventors behind the invention thought to fix the roll of a vehicle whose straight-line behaviour was judged unacceptable because of an excessively slow yaw response by acting on the suspension device of the vehicle. In effect, the suspension device can delay the roll of the vehicle, at least during the initial yaw response phase of the vehicle. In order to prevent the roll of the vehicle, the inventors therefore thought to introduce friction into the suspension device so as to momentarily block the suspension in the initial yaw response phase of the vehicle.

Such friction is of a dry type, that is to say that it is produced by the friction of two solids, one in contact with the other.

Such friction can be introduced directly into the suspension device, for example through friction generating means inserted between the body and the wheel. The friction value is varied by applying a number of values of a force directly onto the suspension device. This force then constitutes the variable parameter.

Such friction can also be introduced indirectly into the suspension device, for example via additional screw forces generated by the wheel (in the sense of the fitted assembly consisting of a wheel and a tyre). This additional screw force applied to the wheel centre generates an additional torque on the wheel which modifies the operating point of the suspension device so as to modify the friction generated between the elements thereof. The friction value can be varied by modifying the additional screw force generated by the wheel. For example, in the case of a MacPhearson suspension device, the friction is induced by a shear force that is exerted by the additional torque of the wheel on the suspension device.

The characterization method according to the invention makes it possible to determine how to modify the vehicle and to quantify the friction so as to render the straight-line behaviour satisfactory.

By virtue of the method according to the invention, how the indicator relating to the friction varies as a function of the variable parameter is determined for the given vehicle. Thus, it is possible to determine which value of the parameter must be applied to the wheel or to the suspension device to induce in the suspension device sufficiently high friction to fix the suspension device in the initial yaw response phase of the vehicle. The indicator relating to the friction may be an energy dissipated by the friction, a friction force or even friction work. It is a quantity that can be determined from the friction generated in the suspension device.

It will be noted that the characterization method according to the invention is applicable to any vehicle provided with one or more suspension devices, regardless of the type of suspension device used: double triangulation, multi-arm axle, rocker bridge or MacPhearson, etc.

Furthermore, the characterization method is specific to each vehicle. In practice, the aim of the method according to the invention is to identify, in the case where the friction is introduced indirectly, the value of the additional wheel-centre screw force needed to fix the suspension in the initial yaw response phase of the vehicle. On some vehicles, the higher this value, the higher the friction, the more fixed the suspension in the initial yaw response phase of the vehicle and better the straight-line behaviour of the vehicle. Conversely, on other vehicles, the lower this value, the higher the friction, the more the suspension is fixed in the initial yaw response phase of the vehicle and the better the straight-line behaviour of the vehicle. On yet other vehicles, the friction is high only over one or more intervals and low outside of this or these intervals.

Since the body is not infinitely rigid in torsion, the straight-line behaviour of a given vehicle is also modified differently depending on whether the characteristics of the front chassis or of the rear chassis are modified. Thus, for some vehicles, the fixing of the rear suspension devices in the initial yaw response phase of the vehicle has no effect on the straight-line behaviour whereas for others, the fixing of the rear suspension devices in the initial yaw response phase of the vehicle makes it possible to obtain a vehicle that exhibits a satisfactory straight-line behaviour.

Advantageously, the given vehicle comprises first and second wheels and first and second suspension devices respectively linking the first and the second wheels to the body.

Preferably, the two wheels form opposite wheels of one and the same axle of the vehicle.

Thus, it is possible to characterize the overall behaviour of the vehicle.

Advantageously, during the stress cycle:
  each wheel is displaced in a direction, called vertical, substantially parallel to the vertical direction of the wheel, and
  for each value of the variable parameter, a variation of a force exerted on each wheel in the vertical direction is measured as a function of the displacement of the wheel in the vertical direction.

Preferably, the first and second wheels are displaced simultaneously in the vertical direction in opposite directions. Thus, the roll of the vehicle is simulated so as to best characterize the behaviour of the vehicle in its yaw response.

For each suspension device, the value of the indicator relating to the friction is determined from a hysteresis of a cycle of the displacement of each wheel as a function of the force exerted on each wheel in the vertical direction.

The hysteresis roughly represents the energy which has been dissipated in the form of friction induced directly or indirectly in the suspension device in the stress cycle.

In one embodiment, the variable parameter comprises a force Fy applied to each wheel in a direction substantially parallel to the transversal direction of the wheel.

The force generates an additional torque about an axis substantially parallel to the longitudinal direction of the wheel which induces a force, called shearing force, in each suspension device and therefore modifies the operating point of the suspension device and can thus induce friction variations between the elements of each suspension device.

Advantageously, the steps A and B are performed for at least one value of Fy, then for a value of Fy opposite to the preceding value. This makes it possible to fairly comprehensively explore the possible values of the variable parameter.

In another embodiment, the variable parameter comprises an offset value of each wheel.

Advantageously, the steps A and B are performed for at least one offset value equal to an initial offset value modified by a given variation, then for an offset value equal to the initial offset value modified by a variation opposite to the preceding variation. This makes it possible to fairly comprehensively explore the possible values of the variable parameter.

In another embodiment, the variable parameter comprises an angle of inclination or a steering error angle of the suspension device.

According to an optional characteristic, if the method is performed on a test bench comprising a frame, the body is fixed relative to the frame. Thus, the value of the friction induced directly or indirectly in each suspension device is determined with accuracy.

Another subject of the invention is a method for improving the behaviour of a given vehicle, characterized in that:
  the behaviour of the given vehicle is characterized by implementing a characterization method as defined above,
  the given vehicle is modified so as to generate friction in the suspension device so that the indicator relating to the friction of the modified vehicle is greater than or equal to the predetermined threshold.

As specified above, the vehicle can be modified by acting directly on the suspension device, for example by adding friction generating means, so as to fix the roll in the initial yaw response phase of the vehicle. It is also possible to modify the vehicle by acting indirectly on the suspension, for example by modifying a torque that the wheel exerts on the suspension device.

In both cases, the friction acting in the suspension device is modified so as to fix the roll of the vehicle in its initial yaw response phase. The friction may occur between two elements of the suspension device forming guideways, between two elements of the suspension device that are mobile on rotational contact with one another or else between an element of the suspension device and an element of the body or even between an element of the suspension device and an element of the wheel.

The behaviour of the given vehicle can be modified by virtue of the following optional characteristics:
  Since the mounted assembly comprises a wheel and a tyre, the tyre and/or the wheel is modified. The modifications of the tyre notably comprise modifications of the architecture, for example the composition and the geometry of the different layers of which it is made, or of the sculptures of its tread. The modifications of the wheel notably comprise modifications to the rigidity of the wheel, the diameter of the wheel rim and the wheel offset (rim offset).
  Since the mounted assembly comprises a wheel with a disc and a wheel rim, and a tyre, a ring is fitted between the wheel rim and the tyre. By adjusting the characteristics of the ring, notably the side of the wheel on which the ring is arranged or the size of the ring, it is possible to adjust the value of the torque that the mounted assembly exerts on the suspension device.
  A geometry of at least one suspension device of the vehicle is modified by means of at least one parameter selected from: the parallel alignment of the vehicle, the static camber of the vehicle, the steering error angle of each suspension device and the angle of inclination of each suspension device.

Since the vehicle comprises a hub, a shim is fitted between the hub and the wheel.

BRIEF DESCRIPTION OF THE DRAWINGS

The invention will be better understood on reading the following description, given solely as a nonlimiting example and with reference to the drawings in which.

DETAILED DESCRIPTION OF EMBODIMENTS OF THE INVENTION

Figure 1:
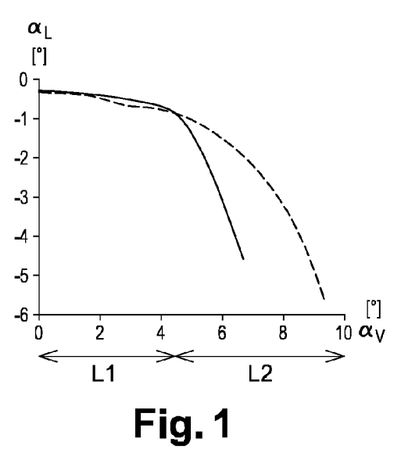
FIGS. 1 and 2 represent the yaw angle response of a given vehicle as a function of the steering wheel angle.

FIG. 1 shows the variations of the yaw angle $\alpha_L$, as a function of the steering wheel angle $\alpha_V$ of a given vehicle V for two types of tyres. The curves illustrated represent the response of the vehicle V provided respectively with tyres AA (solid line) and BB (dotted lines).

Two angular intervals L1, L2 of steering wheel angles $\alpha_V$ are distinguished. In the angle interval L1 ranging from 0° to 4°, the response of the vehicle V is almost zero with the tyres AA or BB. In practice, the yaw angle $\alpha_{L1}$, is less than 1° in the interval L1. In the interval L2 ranging from 4° to 10°, the response of the vehicle V is delayed with the tyres BB. In practice, at the yaw angle value $\alpha_L=4°$, the tyre AA required approximately 2° less steering angle $\alpha_V$ than the tyre BB. Over the interval L2, the tyre AA therefore exhibits a better response than the tyre BB.

Figure 2:
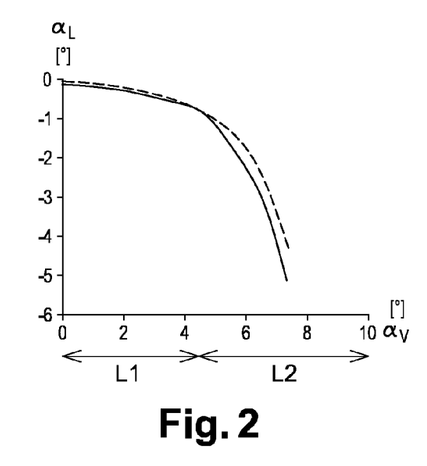

FIG. 2 shows the same vehicle V fitted with the same tyres AA and BB after having modified the vehicle V so as to fix the roll of the vehicle in its initial yaw response phase by introducing dry friction therein. In the interval L2, the response of the vehicle V equipped with the tyre BB is now equivalent to that of the same vehicle V equipped with the tyre AA, which has not changed. Over the interval L2, the tyres AA and BB therefore exhibit a good and substantially equivalent response.

Figure 3:
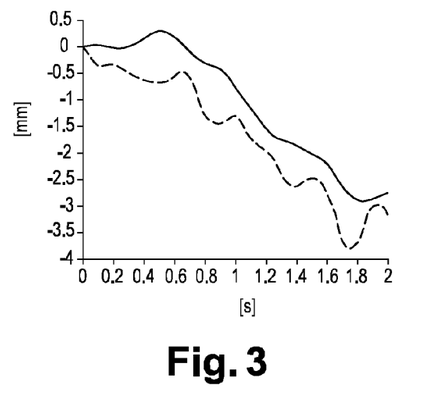
FIGS. 3 and 4 represent the variations of the travel of suspension devices as a function of time.

FIG. 3 shows, during a yaw response of the vehicle V:
the variations as a function of time of the travel of a suspension of the vehicle V fitted with the tyres AA and for which the straight-line behaviour has been judged satisfactory (solid line),
the variations as a function of time of the travel of a suspension of the vehicle V fitted with the tyres BB and for which the straight-line behaviour has been judged unacceptable (dotted lines).

The suspension of the vehicle V fitted with tyres AA is substantially inactive for a duration of approximately 0.5 s counted from the start of the stress on the steering wheel so that the travel is substantially zero over this duration. Conversely, the suspension of the vehicle V fitted with the tyres BB is active for this duration so that a travel of approximately 0.5 mm occurs. This travel of 0.5 mm provokes a roll of the vehicle V from the start of the stress on the steering wheel. The roll corresponds to an inclination of the body of the vehicle about an axis substantially parallel to the longitudinal axis of the vehicle V.

The inventors behind the invention have found, surprisingly, that the more the roll movement of the vehicle was delayed when the latter began a turn, the faster the response of the yaw angle $\alpha_L$ was, and the better the straight-line behaviour of the vehicle V was. With reference to FIGS. 1 and 2, this amounts to reducing as far as possible the interval L1 in which the response is almost zero.

Figure 4:
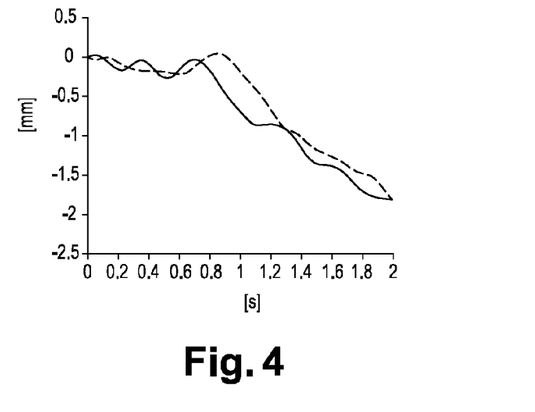

This has been verified with reference to FIG. 4 illustrating the variations of the travel of the suspension of the vehicle V fitted with the tyres AA (solid line) and of the suspension of the vehicle V fitted with the tyres BB (dotted lines) after the vehicle V has been modified so as to fix, by virtue of the introduction of dry friction, the suspension devices for the duration of approximately 0.7 s counted from the start of the steering wheel stress. In both cases, the suspension devices of the vehicle V are substantially inactive for the duration approximately 0.7 s counted from the start of the steering wheel stress so that the travel is substantially zero over this duration. In both cases, the vehicle V exhibits a straight-line behaviour that is judged satisfactory by a tester.

Figure 5:
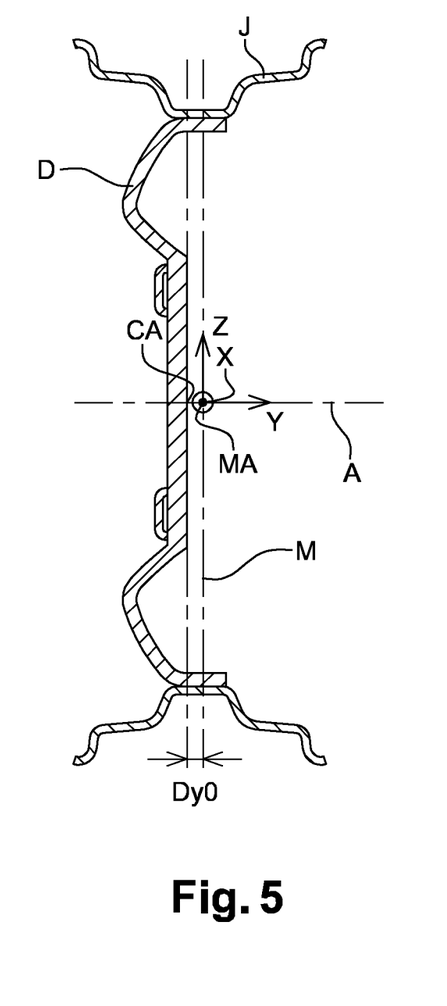
FIG. 5 is an axial cross-sectional view of a wheel of the vehicle, in the particular sense defined previously.

FIG. 5 shows a vehicle wheel, in the particular sense defined previously, comprising a disc D and a wheel rim J.

FIG. 5 also shows geometrical elements that are usually identified on a wheel, namely the median plane M of the wheel, the axis A of the wheel, the point MA defined by the intersection between the median plane M and the axis A of the wheel, and the centre CA of the wheel. The centre CA is a point defined by the intersection of the axis A of the wheel and of a face of the disc D intended to bear on a hub bearing the wheel.

FIG. 5 also shows a geometrical coordinate system, the origin of which is at MA, called wheel coordinate system. This coordinate system comprises axes X, Y and Z, orthogonal to one another, respectively corresponding to the usual longitudinal (axis X), transversal (axis Y) and vertical (axis Z) directions of a vehicle wheel.

It will be noted that, by convention, the positive direction of the axis Y is directed from outside to inside of the vehicle and the negative direction of the axis Y is directed from inside to outside of the vehicle.

When two wheels such as the one illustrated in FIG. 5 form opposite wheels of one and the same axle, they each form a specular image of the other. The same therefore applies for the wheel coordinates respectively linked to the points MA of the wheels.

It will also be noted that, by convention, a torque of substantially longitudinal axis is considered as positive when it tends to reduce the rake angle of the wheel and as negative when it tends to increase the rake angle of the wheel. It will be recalled that the rake angle of a wheel is the angle that is formed, in a plane perpendicular to the ground and containing the axis A of the wheel, between the median plane M of the wheel and the median plane of the vehicle. The term counter-rake (or negative rake) is used when the median planes M of the wheels of one and the same axle intersect above the ground.

Finally, it will be noted that the offset of a wheel Dy such as that represented in FIG. 5 is the distance between the points CA and MA. In FIG. 5, the wheel offset has a value Dy0.

A characterization method according to a first embodiment of the invention is described below. Reference will notably be made to FIGS. 6 to 12.

The characterization method is implemented by means of the vehicle V and a KNC (Kinematics and Compliance) type test bench.

The vehicle V comprises a body 10, first and second wheels 12, 14, in the general sense defined previously, and first and second suspension devices 16, 18 respectively linking the first and second wheels 12, 14 to the body 10. Each device 16, 18 is schematically represented in FIGS. 6 to 10 by a suspension device of double triangulation type. As a variant, each device 16, 18 could be of MacPhearson or rocker bridge, or multi-arm, etc. type.

The two wheels 12, 14 form opposite wheels of one and the same axle (front or rear) of the vehicle. Each wheel 12, 14 has a wheel coordinate system associated with it as defined for the wheel represented in FIG. 5.

The test bench comprises first and second mobile supports 20, 22, respectively bearing the first and second wheels 12, 14, and a fixed frame (not represented). The body 10 is fixed relative to the frame.

According to the characterization method, each wheel 12, 14, and therefore each suspension device 16, 18, is stressed so as to simulate the roll undergone by the vehicle V during a given vehicle steering wheel stress. To this end, cycles of vertical displacements of the wheels 12, 14 relative to the body 10 substantially parallel to the axis Z of the wheel coordinate systems are imposed, via supports 20, 22. The displacements of one wheel are made in a direction opposite to the displacements of the other wheel.

The suspension devices 16, 18 are stressed during the displacement of the wheels 12, 14 which generates friction in these devices 16, 18.

The method uses a parameter that is made to vary in order to modify this friction.

In the first embodiment of the characterization method of the invention, the variable parameter is a force Fy, applied to each wheel, substantially parallel to the axis Y of the wheel coordinate system.

Thus, in the method according to the first embodiment of the invention, simultaneously with the displacements of the wheels 12, 14, first and second forces Fy, of the same modulus, are applied, via the supports 20, 22, respectively to the first and second wheels 12, 14.

The first and second forces Fy generate first and second additional torques C12, C14 about axes that are substantially parallel to the axis X of the wheel coordinate systems. In this first embodiment, each additional torque C12, C14 is defined by the product Fy·Re in which Re is the flattened radius of each wheel 12, 14. The additional torques C12, C14 vary as a function of the variable parameter Fy.

The variation of the force Fy has the effect of modifying the operating point of the suspension devices 16, 18 and consequently the friction generated in the suspension devices 16, 18.

The stress cycles of the wheels 12, 14, and therefore of the suspension devices 16, 18, are described below in more detail in accordance with the first embodiment of the characterization method.

In a first stress cycle (FIGS. 6 to 8), the forces Fy applied to the wheels 12, 14 are positive by considering each of them in their respective wheel coordinate system, so that the additional torques C12, C14 are applied to the wheels in directions which are the specular image of one another.

Figure 6:
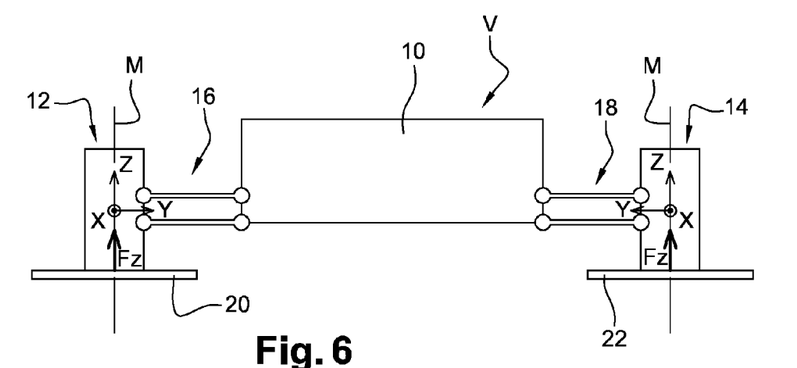
FIGS. 6 to 10 illustrate a characterization method according to a first embodiment of the invention applied to the given vehicle.
Figure 7:
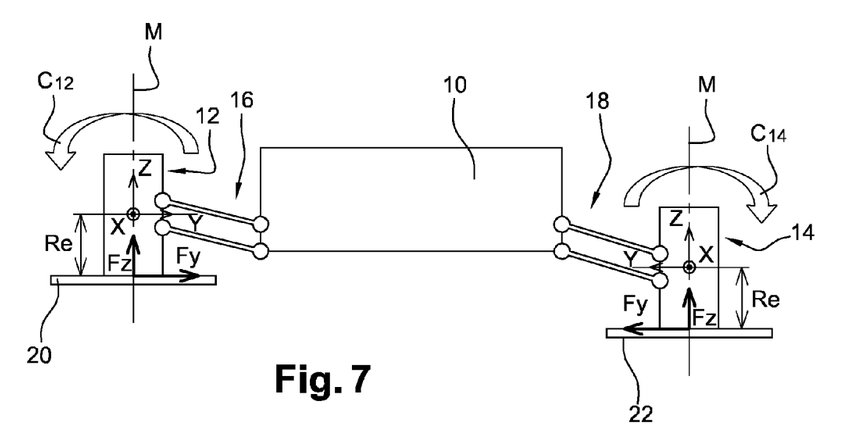
Figure 8:
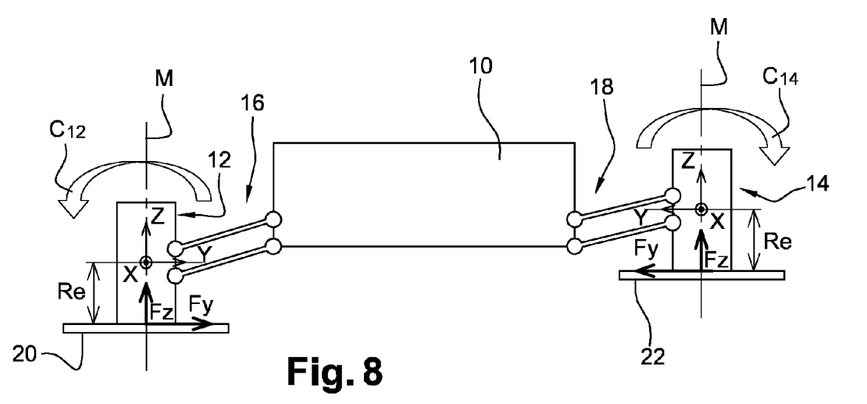

Moreover, referring to FIGS. 6 to 8, it can be seen that, in the first stress cycle:
during a first step, the wheel 12 is vertically displaced from a rest position illustrated in FIG. 6 to a maximum high position illustrated in FIG. 7, and the wheel 14 is displaced vertically from a rest position illustrated in FIG. 6 to a maximum low position illustrated in FIG. 7, then
during a second step, the wheel 12 is displaced vertically from the maximum high position of FIG. 7 to a maximum low position illustrated in FIG. 8, and the wheel 14 is displaced vertically from the maximum low position of FIG. 7 to a maximum high position illustrated in FIG. 8, and
during a third step, the wheel 12 is displaced vertically from the maximum low position of FIG. 8 to the rest position of FIG. 6, and the wheel 14 is displaced vertically from the maximum high position of FIG. 8 to the rest position of FIG. 6.

In a second stress cycle (FIGS. 6, 9 and 10), the forces Fy applied to the wheels 12, 14 are negative, considering each of them in their respective wheel coordinate system, so that the torques C12, C14 are applied in reverse directions relative to the first stress cycle.

Figure 9:
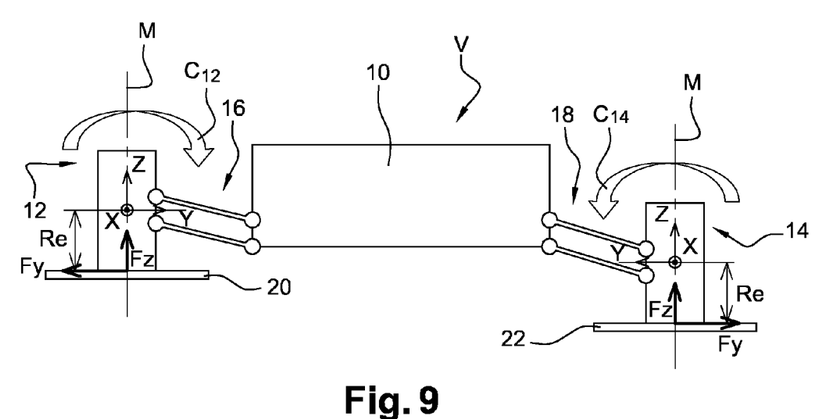
Figure 10:
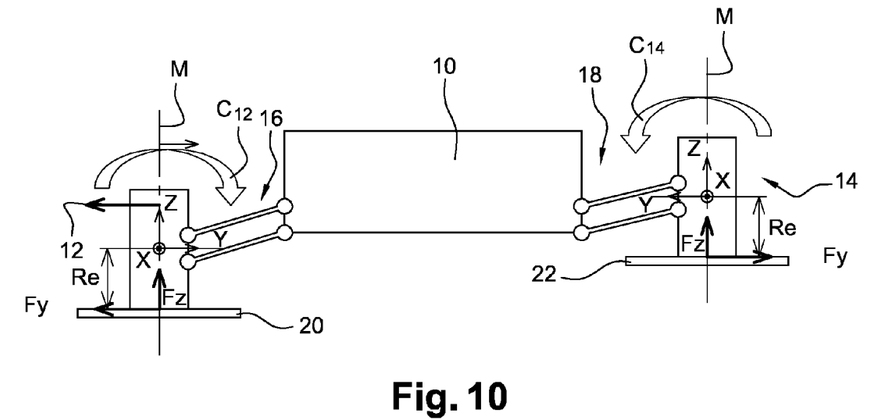

Moreover, in the second stress cycle, steps of vertical displacement of the wheels 12, 14 are performed that are similar to those of the first cycle (see FIGS. 6, 9 and 10).

Each cycle stresses each device 16, 18 so as to identify friction present in each device 16, 18.

During these first and second stress cycles, the variation of a force Fz exerted, parallel to the wheel coordinate system axis Z, on each wheel 12, 14 by each support 20, 22 is measured as a function of the displacement of each wheel 12, 14 in this vertical direction.

Figure 11A:
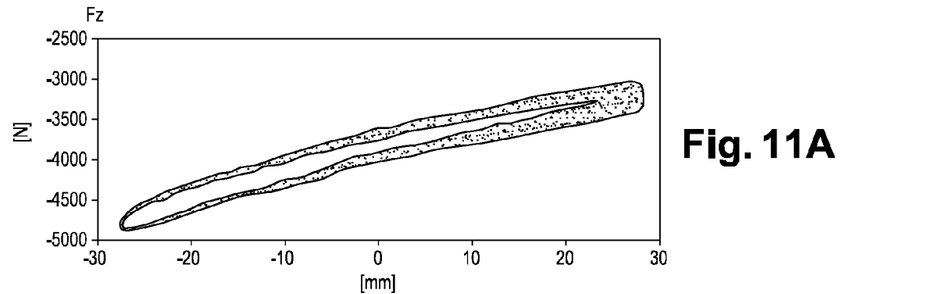
FIGS. 11A, 11B and 12 illustrate the results of the characterization method according to the first embodiment applied to the given vehicle.
Figure 11B:
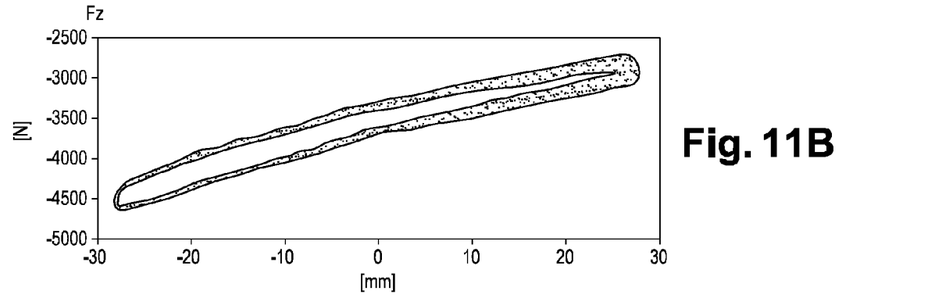

The first and second cycles are repeated by varying the parameter, here the force Fy. The FIGS. 11A and 11B are then obtained, which illustrate the variations of the force Fz as a function of the vertical travel respectively of each wheel 12, 14 for all the values of the variable parameter Fy. Thus, for each value of Fy, the variations take the form of a hysteresis cycle exhibiting a hysteresis. For each value of Fy, the value of an indicator relating to the friction characterized in the stress cycle is determined, in this case on the basis of the hysteresis of each cycle. In the case in point, the hysteresis corresponds to the energy dissipated in each suspension device 16, 18 in the form of friction forces Fr generated in each device 16, 18, for example between the elements of each device 16, 18. The variations of the indicator relating to the friction, here the friction force Fr, as a function of the variable parameter, here Fy, have therefore been determined.

Figure 12:
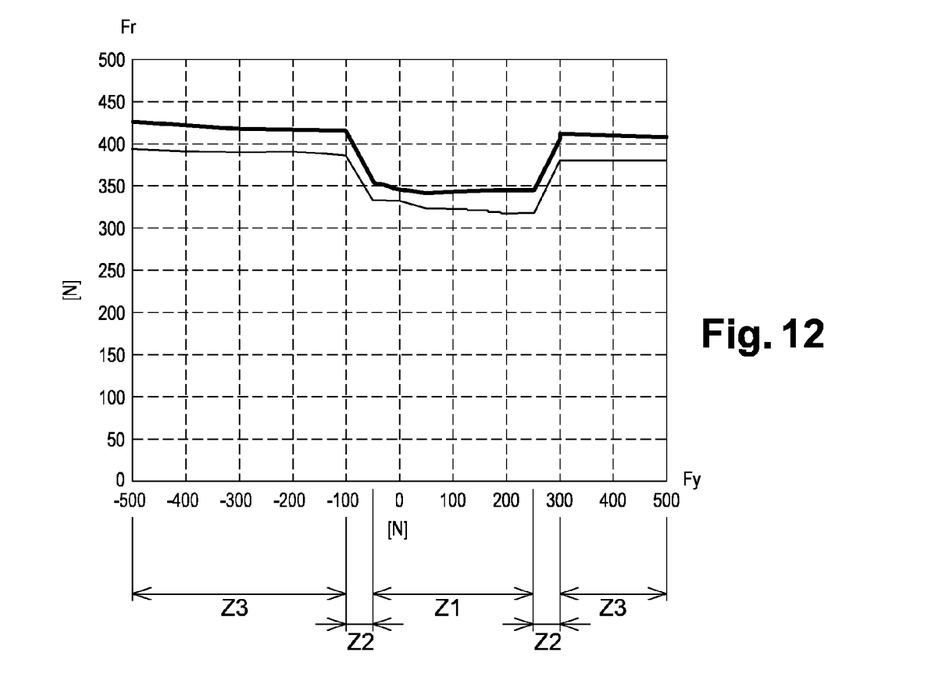

The FIG. 12 is then obtained which illustrates the variation of the indicator relating to the friction, here Fr, of the friction as a function of the variable parameter, here Fy, for the given vehicle V. The variations of the friction force Fr of each device 16 (thin line), 18 (thick line) are substantially analogous and exhibit three intervals Z1, Z2 and Z3. In the interval Z1, called low friction interval, corresponding to values of Fy contained within the interval [−50; 250], the value of the friction force Fr of each device 16, 18 is substantially equal to 325 N (device 16) and 350 N (device 18). In the interval Z2, called transition interval, corresponding to values of Fy contained within the intervals [−100; −50] and [250; 300], the value of the friction force Fr varies rapidly between 325 and 380 N (device 16) and between 350 and 425 N (device 18). In the interval Z3, called high friction interval, corresponding to values of Fy contained within the intervals [−500; −100] and [300; 500], the value of the friction force Fr of each device 16, 18 is substantially equal to 380 N (device 16) and 425 N (device 18).

The vehicle V characterized here has a predetermined threshold of the indicator relating to the friction of 375 N, beyond which the straight-line behaviour is satisfactory.

By virtue of the characterization method according to the invention, in the interval Z1, the vehicle V can be expected to exhibit a relatively early roll in the initial yaw response phase because the friction force Fr is too low to fix each device 16, 18. The tester can be expected to judge the straight-line behaviour as unacceptable.

In the interval Z2, the vehicle V can be expected to exhibit a variable roll in the initial yaw response phase because the friction force Fr varies rapidly. The tester can be expected to judge the straight-line behaviour as non-constant and therefore unacceptable.

Finally, in the interval Z3, the vehicle can be expected to exhibit a relatively delayed roll in the initial yaw response phase because the friction force Fr is sufficiently high to fix each device 16, 18. The tester can be expected to judge the straight-line behaviour as satisfactory.

Thus, the straight-line behaviour of the vehicle V can be improved by fixing its roll in its initial yaw response phase. To fix the roll, the value of the friction force Fr is increased beyond a predetermined threshold, here 375 N. For example, each tyre can be modified so that it generates a positive force Fy with a modulus greater than 300 N or a negative force Fy with a modulus greater than 100 N.

Figure 13:
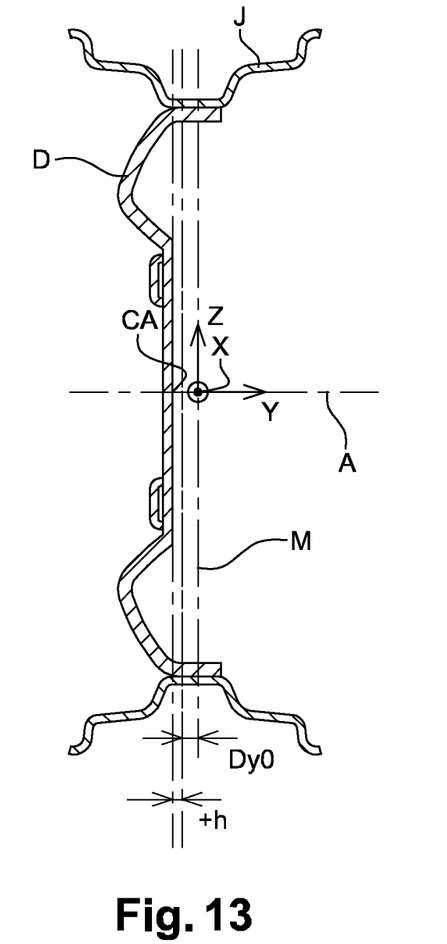
FIGS. 13 and 14 are views similar to FIG. 5 showing two modifications of the wheel during a characterization method according to a second embodiment of the invention applied to the given vehicle.
Figure 14:
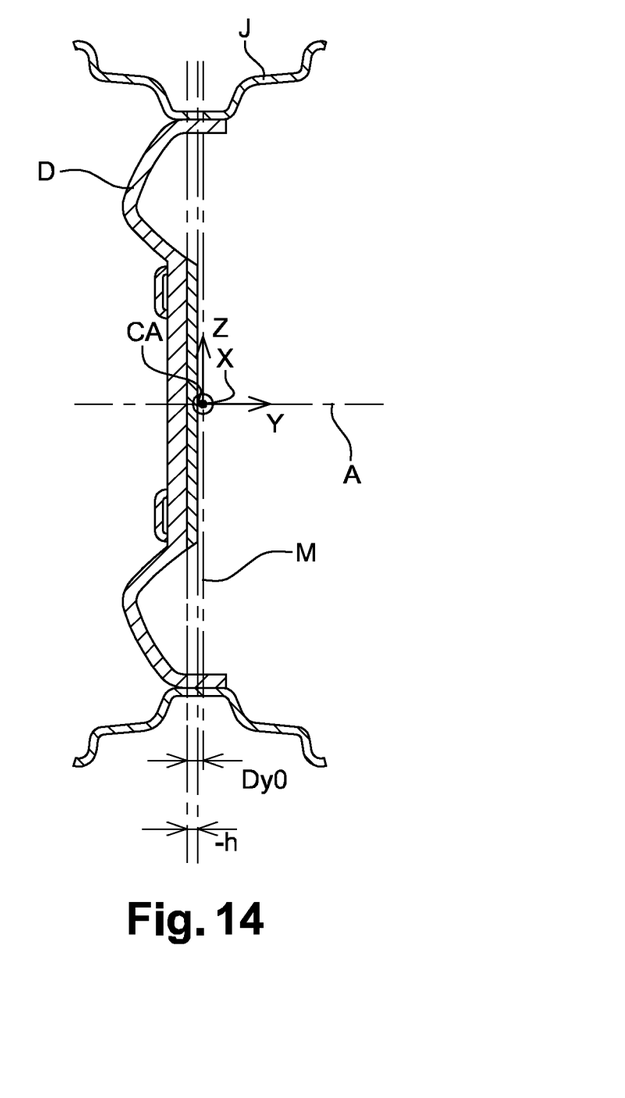

A characterization method according to a second embodiment of the invention is described below. Reference will notably be made to FIGS. 13 and 14 and to the numerical references already introduced in the preceding figures. Identical numerical references will designate elements that are identical or similar, mutatis mutandis, to those described in the preceding figures which are therefore not illustrated again.

The characterization method according to the second embodiment is implemented, as for the preceding embodiment, by means of the vehicle V and of the test bench of KNC (Kinematics and Compliance) type.

In the characterization method according to the second embodiment, the variable parameter is the offset Dy of each wheel 12, 14 that is varied for example by +/− h from an initial value Dy0. Thus, in this embodiment, no force Fy is applied, as defined in the preceding embodiment, but the point of application of the forces exerted by the wheel on the suspension device is brought closer to or moved further away from the body. First and second additional torques C12, C14 are thus generated about axes that are substantially parallel to the axis X of the wheel coordinate systems. These additional torques C12, C14 are variable as a function of the variation of the parameter Dy. In this embodiment, each additional torque C12, C14 is defined only by the product Fz·Dy in which Dy=Dy0+/−h, h being the offset variation of each wheel, and Fz is the force exerted parallel to the axis Z of the wheel coordinate system on each wheel 12, 14 by each support 20, 22.

Considering h to be positive, to be able to impose an offset value equal to Dy0+h (see FIG. 13), that is to say, to be able to move the point of application of the forces of the wheel closer to the body, the wheel disc D can be machined in order to modify the rim offset of the wheel.

To return the offset to its initial value or to be able to impose an offset value equal to Dy0−h (see FIG. 14), that is to say, to be able to move the point of application of the forces of the wheel further away from the body, a shim of appropriate thickness can be added.

Stress cycles of the wheels 12, 14 will be described below in more detail in accordance with the second embodiment of the characterization method.

In a first stress cycle, an offset value equal to Dy0+h (see FIG. 13) is imposed on each wheel 12, 14. This value Dy0+h is obtained by machining the disc D. First and second additional torques C12, C14 are thus generated about axes substantially parallel to the axis X of the wheel coordinate systems. The additional torques C12, C14 are applied to the wheels in directions which are the specular image of one another.

Moreover, in this first stress cycle, the wheels 12, 14 are displaced vertically in a manner similar to what was described for the characterization method according to the first embodiment of the invention.

In a second stress cycle, an offset value equal to Dy0−h is imposed on each wheel 12, 14 (see FIG. 14). This value Dy0−h is obtained by adding a shim of appropriate dimension. First and second additional torques C12, C14 are thus generated which are applied in reverse directions relative to the first stress cycle.

During each stress cycle, the variation of the force Fz exerted on each wheel 12, 14 as a function of the vertical displacement of each wheel 12, 14 is measured.

The first and second cycles are repeated by varying the parameter, here the offset Dy. The variations of the force Fz as a function of the vertical travel respectively of each wheel 12, 14 are thus obtained for all the values Dy. Thus, for each value of Dy, the variations take the form of a hysteresis cycle exhibiting a hysteresis. For each value of Dy, the value of an indicator relating to the friction characterized in the stress cycle is determined, here on the basis of the hysteresis of each cycle. The variations of the indicator relative to the friction, here the friction force Fr, as a function of the variable parameter, here Dy, have therefore been determined.

In a third embodiment which is not illustrated, a force is applied directly onto the suspension device, for example by tightening or loosening a stress exerted on friction generating means arranged in the suspension device so as to vary the friction force Fr.

In the different embodiments described above of the characterization method according to the invention, this method is applied to two wheels 12, 14 forming opposite wheels of one and the same axle of the vehicle V. As a variant, the characterization method according to the invention could be applied to a single wheel of the vehicle. Generally, the vehicle comprises at least two front and rear axles, so that the characterization method according to the invention will preferably be applied to the wheels of a first axle then to the wheels of a second axle.

Also as a variant, the variable parameter could comprise an angle of inclination or a steering error angle of the wheel.

Whatever the embodiment, the variations of the friction force Fr of the suspension devices as a function of the variable parameter are specific to each vehicle. Thus, each vehicle exhibits a unique behaviour which has to be studied.

As an example, FIGS. 15 to 19 show the variations of the friction force Fr as a function of the force Fy for a wheel and a front right device of six different types of vehicles.

Figures 15, 16:
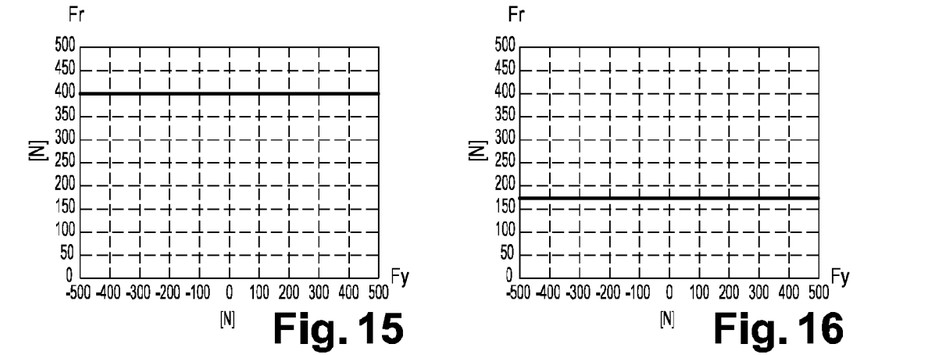
FIGS. 15 to 20 illustrate results of the characterization method according to the first embodiment, applied to other vehicles different from that concerning FIGS. 11A, 11B and 12.

The vehicles tested with reference to FIGS. 15 and 16 exhibit a value of the friction force Fr that is constant regardless of the value of the force Fy. Thus, the straight-line behaviour of the vehicle cannot be improved by modifying the vehicle so as to fix its roll in its yaw response phase. Other modifications of the vehicle will need to be undertaken. For these vehicles, it will be best to determine the suitable value of the friction force Fr that makes it possible to fix the roll of the vehicle sufficiently in its yaw response while not excessively stiffening each device 16, 18, which could be detrimental to the comfort of the vehicle. The value of the friction force Fr is therefore determined according to a trade-off between the behaviour and the comfort of the vehicle.

Figures 17, 18:
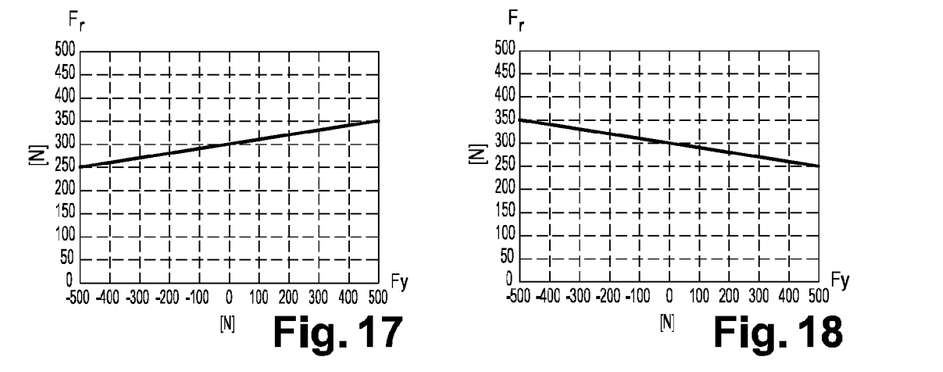

The vehicle tested with reference to FIG. 17 exhibits a value of the friction force Fr that increases with the value of the force Fy. Thus, the straight-line behaviour of the vehicle can be improved by fixing its roll more in its yaw response. In this example, it is necessary to increase the value of the friction force Fr beyond a predetermined threshold, here 325 N, to fix the roll. Thus, it will be possible to modify the vehicle, for example by changing tyres, so that it generates a force Fy with a modulus 300 N and a positive direction relative to the axis Y, that is to say, so that the friction force Fr is greater than 325 N. However, as specified above, it will be best to determine the suitable value of the friction force Fr so that each device 16, 18 is not excessively stiffened in order to find a good trade-off between the behaviour and the comfort of the vehicle.

The vehicle tested with reference to FIG. 18 conversely exhibits a friction value that decreases with the value of the force Fy. In this example, the value of the friction force Fr has to be increased beyond a predetermined threshold, here 325 N, to fix the roll. Thus, it will be possible to modify the vehicle, for example by changing tyres, so that it generates a force Fy with a modulus 300 N and negative direction relative to the axis Y, that is to say, so that the friction force Fr is greater than 325 N.

Figure 19:
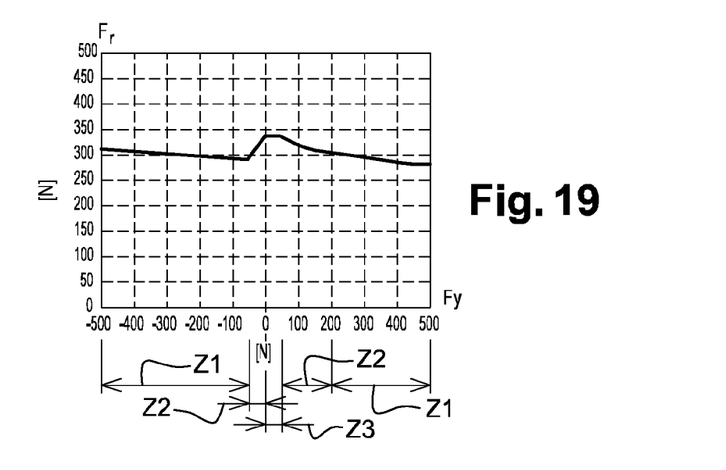

The variations of the friction force Fr of the vehicle tested with reference to FIG. 19 exhibit an interval Z1 of low friction values corresponding to values of Fy here contained in the intervals [−500; −50] and [200; 500], a transitional interval Z2 corresponding to values of Fy contained in the intervals [−50; 0] and [50; 200] and an interval Z3 of high friction values corresponding to values of Fy contained in the interval [0; 50]. In this example, the value of the friction force Fr must be increased beyond a predetermined threshold, here 325 N, that is to say, in a region of values of Fr that is as favourable as possible, to fix the roll. Thus, it will be possible to modify the vehicle, for example by changing tyres, so that it generates a force Fy with a low modulus of between 0 and 50 N and with a positive direction relative to the axis Y, that is to say so that the friction force Fr is greater than 325 N.

Figure 20:
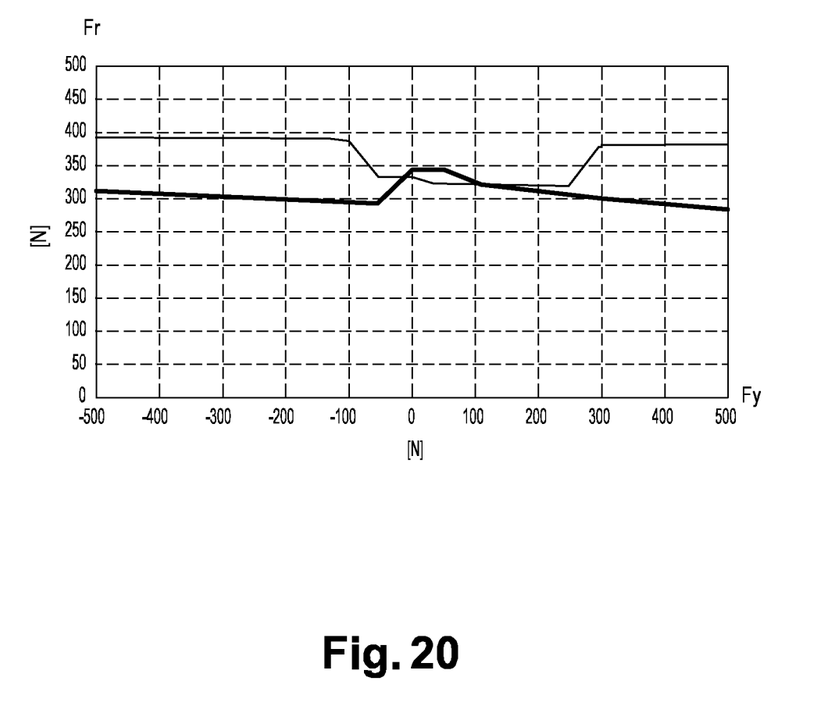

Thus, as represented in FIG. 20 which illustrates the superposition of the curves of FIGS. 12 and 19, if the results of the characterization method for the vehicle of FIG. 12 are used on the vehicle of FIG. 19, the behaviour of the vehicle will be degraded and not improved. This is because, in FIG. 12, the interval Z3 of high friction values and therefore corresponding to a straight-line behaviour that is satisfactory to the tester, corresponds to the interval Z1 of low friction values of the vehicle of FIG. 19 and therefore corresponding to a behaviour that is unacceptable to the tester. Thus, if the tyre of the vehicle of FIG. 12 is modified so that it generates a force Fy with a modulus 300 N and positive direction on the axis Y or a force Fy with a modulus 100 N and negative direction on the axis Y, a vehicle is obtained which exhibits a straight-line behaviour that is satisfactory to the tester, whereas, by applying the same modifications to the vehicle of FIG. 19, a vehicle is obtained for which the friction force Fr of the suspension devices is too low, therefore exhibiting an early roll in its yaw response and therefore a straight-line behaviour that is unacceptable to the tester.

In order to improve the behaviour of a given vehicle, it is also possible to modify the given vehicle by adding friction generating means in at least one suspension device. The friction generating means are suitable for generating friction in the suspension device so that the force Fr is greater than or equal to the predetermined threshold, that is to say, in a favourable region corresponding to the highest values of the friction force Fr for the given vehicle. Thus, the given vehicle is modified so as to momentarily fix its roll following stress on the steering wheel.

Figure 21:
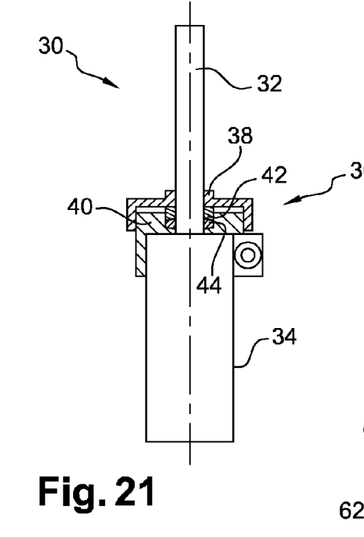
FIGS. 21 to 24 illustrate modifications made to the vehicle respectively according to first, second, third and fourth embodiments of a method for improving the vehicle.

FIG. 21 shows a first embodiment of an improvement method by illustrating a suspension device 30 of the given vehicle after modification. The device 30 comprises a rod 32 and a sleeve 34. The device 30 also comprises a sealing gland (or stuffing box) 36 comprising a nut 38, a lock nut 40 attached to the sleeve 34, a ring 42 made of deformable and rubbing material, advantageously of packing material or of polyurethane, and a tapered ring 44. Under the effect of the tightening of the nut 38, the packing ring 42 is deformed between the tapered ring 44 and the nut 40 which increases the friction between the packing ring 42 and the rod 32.

Figure 22:
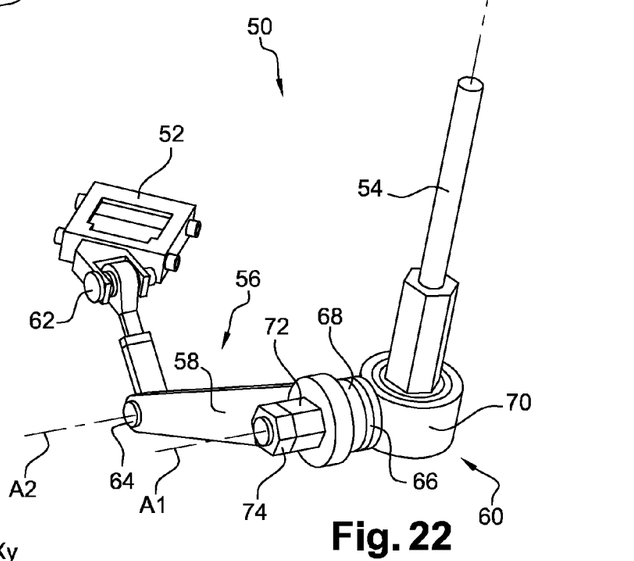

FIG. 22 shows a second embodiment of the improvement method by illustrating another type of suspension device 50 of the given vehicle after modification. The device 50 comprises a member 52 for fastening the device 50 to a wheel of the given vehicle and a member for fastening the device 50 to the body of the vehicle. The device 50 also comprises articulation means 56 for articulating the members 52, 54 relative to one another. The articulation means 56 comprises an arm 58 linked, on the one hand, to the member 54 by a double pivot link 60 about axes A1, A2 and, on the other hand, to the member 52 by a pair of ball joints 62, 64. The device 50 is modified by adding a friction ring 66 and a decoupling ring 68 with needles arranged between a base 70 of the member 54 and the arm 58. On the other side of the arm 58, a prestressing spring 72 is added with which to take up the wear of the ring 66 and a nut 74 for tightening the spring 72, the arm 58 and the rings 66, 68 against the base 70. These added elements are mounted on the axis A1. As a variant, they are mounted on the axis A2.

In order to improve the behaviour of a given vehicle it is also possible to modify this given vehicle so as to indirectly generate friction in at least one suspension device. The friction force generated will be greater than or equal to the predetermined threshold for the given vehicle. Thus, the given vehicle is modified so as to fix its roll in its yaw response.

Figure 23:
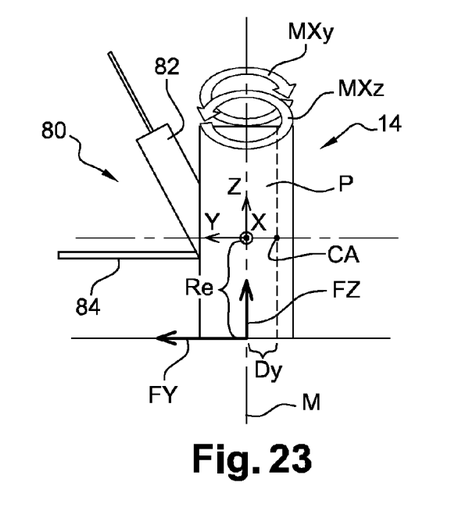

There now follows a description, with reference to FIG. 23, of the third and fourth embodiments of the improvement method by illustrating a front left wheel 14 of the given vehicle comprising a tyre P. The torque exerted on the wheel coordinate system axis X has an effect on the suspension device 80. In order to improve the behaviour of the given vehicle, the torque is modified so that the friction force Fr generated by the torque in the suspension device is greater than or equal to the predetermined threshold.

In order to fix the roll of the given vehicle in its yaw response, the vehicle V is modified so as to modify the value of the resultant torque exerted by the wheel 14 on the device 80 about the axis X. Two torques MXy and Mxz, participating in this resultant torque, can be modified.

The first torque MXy is defined by $MXy = FY \cdot Re$ in which FY is the force exerted by the ground on the tyre P when rolling parallel to the direction Y of the wheel coordinate system and Re is the flattened radius of the wheel 14.

The second torque MXz is defined by MXz=FZ·Dy in which Fz is the force exerted by the ground on the tyre P parallel to the direction Z of the wheel coordinate system and Dy is the offset of the wheel.

Each torque MXy, MXz generates a stress on the suspension device 80 which results in the appearance of friction within this device 80, for example on the damper 82, and therefore a fixing of the roll in the initial yaw response phase of the vehicle. Depending on the type of each suspension device 16, 18, each torque MXy, MXz generates a stress which will result in more or less friction in the suspension device.

Figure 24:
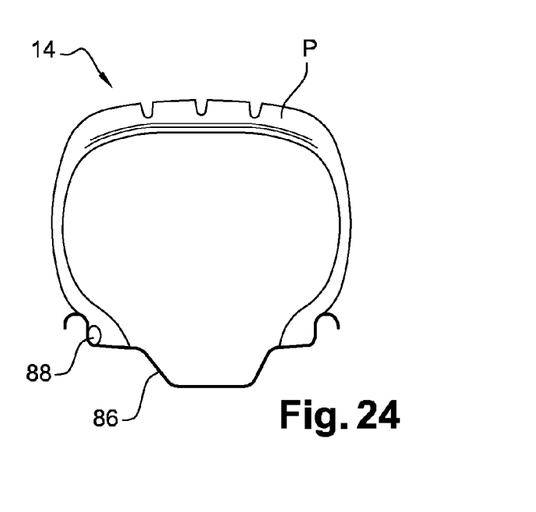

In the third embodiment of the improvement method, the wheel 14 is modified. In the case in point, and as represented in FIG. 24, the wheel 14 comprises a wheel rim 86 on which the tyre P is fitted. The given vehicle is modified by modifying the mounted assembly 14 by adding a ring 88 between the wheel rim 86 and the tyre P. The ring 88 causes a dissymmetry of the tyre P which primarily modifies FY and therefore MXy. As an example, a ring 88 that has a diameter of between 4 and 5 mm makes it possible to increase or reduce the torque MXy by 3 N·m.

In the fourth embodiment of the improvement method, the torque MXz is modified by modifying Dy. In the case in point, the given vehicle comprising a hub, a shim is fitted between the hub and the wheel 14. Thus, Dy is increased and MXz is increased. As an example, a shim that has a thickness of 1 mm makes it possible to modify the straight-line behaviour so as to render it satisfactory even though it was unacceptable without the shim.

The invention is not limited to the embodiments described previously.

In practice, the torques MXy and/or MXz can be modified by modifying the geometry of at least one suspension device. A small variation of the toe-in or toe-out of the wheels generates a relatively significant torque. It is therefore easy to obtain a sufficiently high torque to fix the roll of the vehicle in its yaw response while retaining a parallel alignment compatible with the other requirements of the constructor.

As a variant, the tyre P, or properties of the tyre P such as its symmetry, can be modified.

In each embodiment described with reference to FIG. 23, only MXy or MXz is modified. As a variant, MXy and/or MXz will be modified and/or the vehicle will be modified by adding friction generating means in the suspension device.

Furthermore, it would be possible to modify the vehicle so as to modify and/or create a torque which is other than parallel to the longitudinal direction of each wheel.

The invention claimed is:

1. A method for characterising a behaviour of a vehicle that includes a body, at least one wheel, and at least one suspension device linking the at least one wheel to the body, the method comprising steps of, for a value of a parameter that when varied modifies a friction generated in the at least one suspension device:
   (A) applying a predetermined stress cycle to the at least one suspension device so as to identify a friction present in the at least one suspension device;
   (B) determining, for the at least one suspension device, a value of an indicator relating to the friction identified in the predetermined stress cycle;
   varying the value of parameter and repeating the steps (A) and (B) so as to obtain a variation of the indicator relating to the friction generated in the at least one suspension device according to the parameter; and
   for the at least one suspension device, determining at least one interval of the parameter in which the indicator relating to the friction is greater than a predetermined threshold for the vehicle.

2. The method according to claim 1, wherein the vehicle includes first and second wheels and first and second suspension devices respectively linking the first and the second wheels to the body.

3. The method according to claim 2, wherein the first and second wheels form opposite wheels of a same axle of the vehicle.

4. The method according to claim 1, wherein during the predetermined stress cycle:
   the at least one wheel is vertically displaced in a direction substantially parallel to a vertical direction of the at least one wheel, and
   for each value of the parameter, a variation of a vertical force exerted on the at least one wheel is measured as a function of a vertical displacement of the at least one wheel.

5. The method according to claim 2,
   wherein during the predetermined stress cycle:
   each of the first and second wheels is vertically displaced in a direction substantially parallel to a vertical direction of the first and second wheels, and
   for each value of the parameter, a variation of a vertical force exerted on each of the first and second wheels is measured as a function of a vertical displacement of each of the first and second wheels, and
   wherein the first and second wheels are vertically displaced simultaneously in opposite orientations.

6. The method according to claim 4, wherein, for the at least one suspension device, the value of the indicator relating to the friction is determined from a hysteresis of a cycle of the displacement of the at least one wheel as a function of the force exerted on the at least one wheel in the vertical direction.

7. The method according to claim 1, wherein the parameter includes a force applied to the at least one wheel in a direction substantially parallel to a transversal direction of the at least one wheel.

8. The method according to claim 7, wherein the steps (A) and (B) are performed:
   for a first value of the parameter, and then
   for a second value of the parameter opposite to the first value of the parameter.

9. The method according to claim 1, wherein the parameter includes an offset value of the at least one wheel.

10. The method according to claim 9, wherein the steps (A) and (B) are performed:
   for a first offset value equal to an initial offset value modified by a first variation, and then
   for a second offset value equal to the initial offset value modified by a second variation opposite to the first variation.

11. The method according to claim 1, wherein the parameter includes an angle of inclination or a steering error angle of the at least one suspension device.

12. The method according to claim 1,
   wherein the method is performed on a test bench that includes a frame, and
   wherein the body is fixed relative to the frame.

13. A method for improving a behaviour of a vehicle, the method comprising steps of:
   characterizing a behaviour of the vehicle, which includes a body, at least one wheel, and at least one suspension device linking the at least one wheel to the body, the characterizing step including substeps of, for a value of a parameter that when varied modifies a friction generated in the at least one suspension device:

(A) applying a predetermined stress cycle to the at least one suspension device so as to identify a friction present in the at least one suspension device, (B) determining, for the at least one suspension device, a value of an indicator relating to the friction identified in the predetermined stress cycle, varying the value of the parameter and repeating the substeps (A) and (B) so as to obtain a variation of the indicator relating to the friction generated in the at least one suspension device according to the parameter, and for the at least one suspension device, determining at least one interval of the parameter in which the indicator relating to the friction is greater than a predetermined threshold for the vehicle; and modifying the vehicle so as to generate friction in the at least one suspension device, such that the indicator relating to the friction of the vehicle after modification is greater than or equal to the predetermined threshold.

14. The method according to claim 13,
wherein the at least one wheel includes a disc, a wheel rim, and a tire, and
wherein the modifying step involves a modification to at least one of: the tire, the disc, and the wheel rim of the at least one wheel.

15. The method according to claim 13,
wherein the at least one wheel includes a disc, a wheel rim, and a tire, and
wherein the modifying step includes fitting a ring between the wheel rim and the tire.

16. The method according to claim 13, wherein a geometry of the at least one suspension device is modified according to at least one parameter selected from:
a parallel alignment of the vehicle,
a static rake of the vehicle,
a steering error angle of the at least one suspension device, and
an angle of inclination of the at least one suspension device.

17. The method according to claim 13,
wherein the vehicle includes a hub, and
wherein a shim is mounted between the hub and the at least one wheel.

* * * * *

UNITED STATES PATENT AND TRADEMARK OFFICE
CERTIFICATE OF CORRECTION

PATENT NO.        : 8,938,330 B2
APPLICATION NO.   : 13/636901
DATED             : January 20, 2015
INVENTOR(S)       : Thibault Dailliez et al.

It is certified that error appears in the above-identified patent and that said Letters Patent is hereby corrected as shown below:

On the Title page under "(73) ASSIGNEES:"

"Michelin Recherche et Techniques S.A." should read
-- Michelin Recherche et Technique S.A. --.

In the Specification

In Column 12

At line 27, "member" should read -- member 54 --.

Signed and Sealed this
Twenty-third Day of June, 2015

Michelle K. Lee
*Director of the United States Patent and Trademark Office*